United States Patent [19]
Hluchyj et al.

[11] Patent Number: 5,402,478
[45] Date of Patent: Mar. 28, 1995

[54] SYSTEM AND METHOD FOR CALL-BY-CALL SOURCE ROUTING WITH RULE-BASED FALLBACKS

[75] Inventors: Michael G. Hluchyj, Wellesley; Pierre A. Humblet, Cambridge; Whay C. Lee, Dorchester, all of Mass.

[73] Assignee: Codex Corporation, Mansfield, Mass.

[21] Appl. No.: 919,682

[22] Filed: Jul. 27, 1992

[51] Int. Cl.$^6$ ............................................. H04M 7/00
[52] U.S. Cl. ................................... 379/221; 379/220
[58] Field of Search ....................... 379/219, 220, 221; 370/16, 60.1

[56] References Cited

U.S. PATENT DOCUMENTS

| | | | |
|---|---|---|---|
| 3,600,522 | 8/1971 | Benson | 379/244 |
| 4,163,124 | 7/1979 | Jolissaint | 379/220 |
| 4,345,116 | 8/1982 | Ash et al. | 379/221 |
| 4,497,979 | 2/1985 | Phelan | 379/309 |
| 4,679,189 | 7/1987 | Olson et al. | 370/94.1 |
| 4,885,780 | 12/1989 | Gopal et al. | 379/221 |
| 5,067,148 | 11/1991 | Sardana | 379/220 |
| 5,153,877 | 10/1992 | Esaki et al. | 370/94.1 |
| 5,206,856 | 4/1993 | Chung | 370/60 |
| 5,208,806 | 5/1993 | Hasegawa | 370/60.1 |
| 5,253,288 | 10/1993 | Frey et al. | 379/221 |
| 5,291,550 | 3/1994 | Levy et al. | 379/242 |

OTHER PUBLICATIONS

Whay C. Lee and P. Kamat, "Integrated Packet Networks with Quality of Service Constraints," IEEE Globecom '91, 1991.

Mordechai I. Henig, "The Shortest Path Problem with Two Objective Functions," European Journal of Operational Research, vol. 25, 1985.

Jeffrey M. Jaffe, "Algorithms for Finding Paths with Multiple Constraints," Networks, vol. 14, 1984.

Richard P. Lippmann, "New Routing and Preemption Algorithms for Circuit-Switched Mixed-Media Networks," MILCOM '85, 1985.

G. Gopal, A. Kumar, and A. Weinrib, "Routing in a Circuit-Switched Network with Priority Classes," IEEE Infocom '89, 1989.

J. F. Stach, "Expert Systems Find a New Place in Data Networks," Networking Software, edited by C. B. Ungaro, Data Communications Book Series, McGraw Hill, 1987.

G. R. Ash, R. H. Cardwell, and R. P. Murray, "Design and Optimization of Networks with dynamic Routing," Bell Laboratories Technical Journal, vol. 60, No. 8, Oct. 1981.

K. S. Narendra, E. A. Wright, and L. G. Mason, "Application of Learning Automata to Telephone Traffic Routing and Control," IEEE Trans. on Systems, Man, and Cybernetics, vol. SMC-7, No. 11, Nov. 1977.

V. V. Marbukh, "Investigation of a Fully Connected Channel Switching Network with Many Nodes and Alternative Routes," Simulation of Behavior and Intelligence, Plenum Publishing Corporation, 1984.

A. Krasniewski, "Fuzzy Automata as Adaptive Algorithms for Telephone Traffic Routing," IEEE ICC '84, 1984.

David D. Clark, "Policy Routing in Internetworks," Internetworking: Research and Experience, vol. 1, 35–52, 1990.

Regnier et al, "State-Dependent Dynamic Traffic Management for Telephone Systems", Oct. 1990, IEEE Communications Magazine, pp. 42–53.

Ash, "Design and Control of Networks with Dynamic Nonhierarchical Routing," Oct. 1990 IEEE Communications Magazine, pp. 34–40.

Key et al, "Distributed Dynamic Routing Schemes," Oct. 1990, IEEE Communications Magazine, pp. 54–64.

*Primary Examiner*—James L. Dwyer
*Assistant Examiner*—Daniel S. Hunter
*Attorney, Agent, or Firm*—Darleen J. Stockley

[57] ABSTRACT

A fallback strategy for a system (700) and method (200) is provided for rerouting a call that fails to be established utilizing a first set of constraints in a communication network system. This strategy enables the communication network system to utilize a look-around-first type of preemption that avoids unnecessary preemption and provides alternate routing for a call according to predetermined constraints selected by a user.

42 Claims, 7 Drawing Sheets

SYSTEM AND METHOD FOR CALL-BY-CALL SOURCE ROUTING WITH RULE-BASED FALLBACKS

FIELD OF THE INVENTION

This invention is generally directed to routing strategy in a communication network system, and is more specifically directed to identifying alternative acceptable paths for integrated traffic types.

Background

Data communication systems have utilized digital transmission systems since the 1960s. Digital data transmission has evolved to a system in which portions of data are transferred discretely in the form of packets over links of a communication network system to reach a desired receiver. For communication network systems supporting integrated traffic types, especially systems that are subject to diverse quality-of-service requirements, routing of packetized data requires a strategic approach. Routing is the mechanism through which a path is derived for establishing communication between a source and a destination in a network.

With increasing demand for a wide spectrum of network services, routing strategies must accommodate various quality-of-service constraints: performance constraints (e.g., throughput, delay, cost, etc.), resource constraints (e.g., transmission medium, channel security, etc.), and priority constraints (e.g., establishment priority, retention priority, etc.). A dynamic network status creates further routing problems.

There exists no efficient algorithm to solve a multi-criteria shortest-path problem with a general utility function including, for example, delay and cost. However, if a linear utility function (e.g., a weighted sum of delay and cost) is assumed, the problem reduces to a single-criterion shortest-path problem with linearly combined link attribute values. If the assumption is that the "optimal" path must be a nondominated (Pareto) path, then one can first generate the set of nondominated paths so that the utility function can be applied to each nondominated path to determine the optimal path. A number of methods have been shown for generating these paths for a shortest-path problem with two objective functions.

A shortest-path problem subject to path constraints is known to be computationally intractable. Although one approach, wherein a pseudopolynomial-time algorithm determines whether a path meets the path constraints (i.e., the algorithm solves the problem in polynomial time if the link metrics have a small range of values), and another approach, wherein an objective function is defined which evaluates how well a path meets the path constraints, have been proposed, both approaches have not seemed to be particularly efficient in practice.

A routing topology is determined by availability and acceptability of links with various resource attributes. A resource attribute (e.g., transmission medium) is defined by a predetermined set of distinct resource attribute values (e.g., satellite, microwave), one and only one of which from the same set may characterize a given resource (e.g., a link cannot be both satellite and microwave). In the past, when resource attributes were specified with binary (include/exclude) choices. Today, the user demands multi-level preferential specification of resource attributes. In conventional single-pass routing, weights are assigned to links, and link weights are incorporated in the routing objective function. The less desirable the attribute value of the link, the heavier the weight assigned to the link. This approach cannot consistently satisfy the user's resource preferences because minimizing the sum of link weights along a path does not guarantee that the individual link weights are also minimized.

Also, several preemption algorithms are known. For example, where calls are first routed using a table-driven routing algorithm that doesn't consider priority levels and a high-priority call is blocked, the call may be routed with preemption that utilizes flooding. Flooding is a distributed routing scheme in which an optimal path is determined by sending out search messages all over the network to obtain information on available paths from the source to the destination. The preemption may be blind or guided. Blind preemption allows preemption on any link as the preempting call is being set up along the shortest available path. In guided preemption, a call is not allowed to preempt any call until a complete path to the destination is found. Since flooding is used, paths with the fewest potential preemptions and the fewest links may be identified and favored. The above algorithms may be reasonable for a military network, for example, where the quality-of-service requirements for the high-priority calls cannot be compromised. In other networks, however, it may not be necessary to minimize any path values as long as the path constraints are satisfied. It may even be desirable to relax the resource constraints so that the performance constraints can be met without unnecessary disruption to the low-priority calls.

Non-preemptive routing strategies for networks with priority classes are also known. Such strategies typically utilize a means for reserving resources for high-priority calls (e.g., separate networks, trunk reservation, trunk subgrouping) or extending the search for feasible paths (e.g., more choices for alternate paths). Thus, non-preemptive priority class routing is simply not very efficient in resource allocation.

In addition, there is also the problem of routing in a dynamic environment. Network status is dynamic, not only because of time-of-day changes in service demand, but also due to incidental disruptions in the network (e.g., link failure). Alternate routing algorithms which are designed to adapt to changes in the network are known. In alternate routing, each node in a network is assigned a predetermined series of alternate paths, and the paths may depend on broadly defined traffic classes and the time of day. The assignment of alternate paths may be periodically updated to adapt to existing network conditions. To determine a path for a call, the alternate paths are attempted sequentially until either one of them is found to be feasible or the call is blocked (completion of all predetermined attempts). The manner in which alternate paths are attempted distinguishes among existing variations of alternate routing.

The simplest class of alternate routing algorithms is fixed alternate routing—i.e., a set of predetermined paths are attempted in a fixed order until a feasible path is found or the call is blocked. A trivial extension of fixed alternate routing is dynamic alternate routing, in which the sequence of alternate paths is time-dependent (e.g., Dynamic Non-Hierarchical Routing or DNHR). A further extension is adaptive alternate routing, in which the sequence of alternate paths is a function of the state of the network (e.g., Trunk Status Map Routing or TSMR).

Other alternate routing paradigms include stochastic alternate routing and fuzzy alternate routing. In stochastic alternate routing, each alternate path is selected with a given probability for a call. The probability assignment for each alternate path is continuously updated to reflect the likelihood of a successful attempt with the path. The greater the likelihood that an alternate path will be successful, the higher the probability that the path will be selected. In fuzzy alternate routing, each alternate path is assigned a value between 0 and 1. This value, determined by a "fuzzy membership" function, indicates the relative order of selection of the path.

Clearly, alternate routing is impractical for integrated networks with heterogeneous users, since the same sequence of alternate paths may not be appropriate for every user. Although alternate routing offers economy of scale in the sense that the same computation performed can be used for many calls, it cannot efficiently support integrated traffic with diverse quality-of-service requirements. The predetermined alternate paths impose unnecessary restrictions on the search for a suitable path.

Single-pass, rule-based routing is known. In this routing strategy, each path is derived from one of several predetermined routing choices, and selection of the appropriate routing choice is based on "expert" rules. "Expert" rules are derived for each selected system utilized. For example, calls with high delay tolerance may be assigned the "poorest" acceptable paths, whereas the calls with a low delay tolerance may be assigned the "best" available paths.

Inter-domain policy routing incorporates policy-related constraints (e.g., for resource control) into path computation and packet-forwarding functions for inter-administrative domain communication. It uses source routing, explicit advertisement of a policy along with topology information, and a link-state style routing protocol. Each administrative domain is governed by an autonomous administration that has distinct goals as to the class of customers it intends to serve, the quality-of-service it intends to deliver, and the means for recovering its cost. The abstract policy route is a series of administrative domains that is specified by the end administrative domain, and each policy gateway selects the next actual policy gateway that is to be used to forward the packets. Though policy routing can accommodate, to some extent, various quality-of-service constraints, the constraints must somehow be translated into domain-based resource constraints, and there is no mechanism to deal with preferential resource constraints.

Thus, there is a need for a routing system and method in a communication network that manages diverse quality-of-service constraints to provide more efficient and flexible routing than known routing techniques.

SUMMARY OF THE INVENTION

A method and system are utilized for routing a call in a communication network having diverse quality-of-service constraints (including performance constraints, resource constraints and priority constraints) wherein a fallback strategy is provided for rerouting a call when an initial attempt to route the call fails. The method includes the steps of: (1) selecting a constrained routing for the call; (2) determining an optimal feasible path and, where the optimal feasible path is available, the network's implementing the optimal feasible path; and (3) implementing a fallback strategy upon one of: (a) determining that the optimal feasible path is unavailable, and (b) the network's being unsuccessful in implementing the optimal feasible path for routing the call.

Similarly, the system for routing a call in a communication network utilizing the fallback strategy includes: (1) a routing unit for selecting a constrained routing for the call; (2) an optimal feasible path determination unit, operably coupled to the routing unit, for determining an optimal feasible path and, where the optimal feasible path is available, for sending a signal to a network unit, thereby causing the network unit to implement the optimal feasible path; and (3) a fallback strategy unit, operably coupled to the optimal feasible path determination unit and the network unit, for implementing a fallback strategy where one of: (a) the optimal feasible path is unavailable, and (b) the network unit is unsuccessful in utilizing the optimal feasible path for routing the call.

BRIEF DESCRIPTIONS OF THE DRAWINGS

DETAILED DESCRIPTION OF A PREFERRED EMBODIMENT

The present invention is a system and method for a call-by-call source routing strategy with rule-based fallbacks for communication networks having integrated traffic types that are subject to diverse quality-of-service requirements. The strategy is to determine an acceptable path for each call in an efficient manner. In contrast to the traditional routing paradigm wherein the primary goal is to minimize a value of a routing objective function (i.e., a path attribute), the routing paradigm of the present invention emphasizes meeting various routing constraints.

In source routing, decisions for routing each call are made entirely at the source, based on global network configurations and status that are updated via a topology broadcast protocol. Call-by-call routing offers the flexibility of tailoring a path to the characteristics and quality-of-service requirements of each call. Fallback routing adapts to changes in the network status and permits alternate path determinations to accommodate preferential resource constraints, call preemption, and other routing features that require multiple path determinations per call setup. Rule-based routing makes use of all available information to modify the fallback sequence of path determinations dynamically, in accordance with network status as well as with connection states.

Thus, the system of the present invention provides a flexible platform for carrying out routing for integrated traffic with diverse quality-of-service requirements such as performance constraints, resource constraints, and priority constraints. Fallback routing allows accommodation of preferential resource constraints and look-around-first call preemption (where routing without preemption is attempted before preemption), both of which are not accommodated by presently known single-pass rule-based routing.

Figures 8, 9:
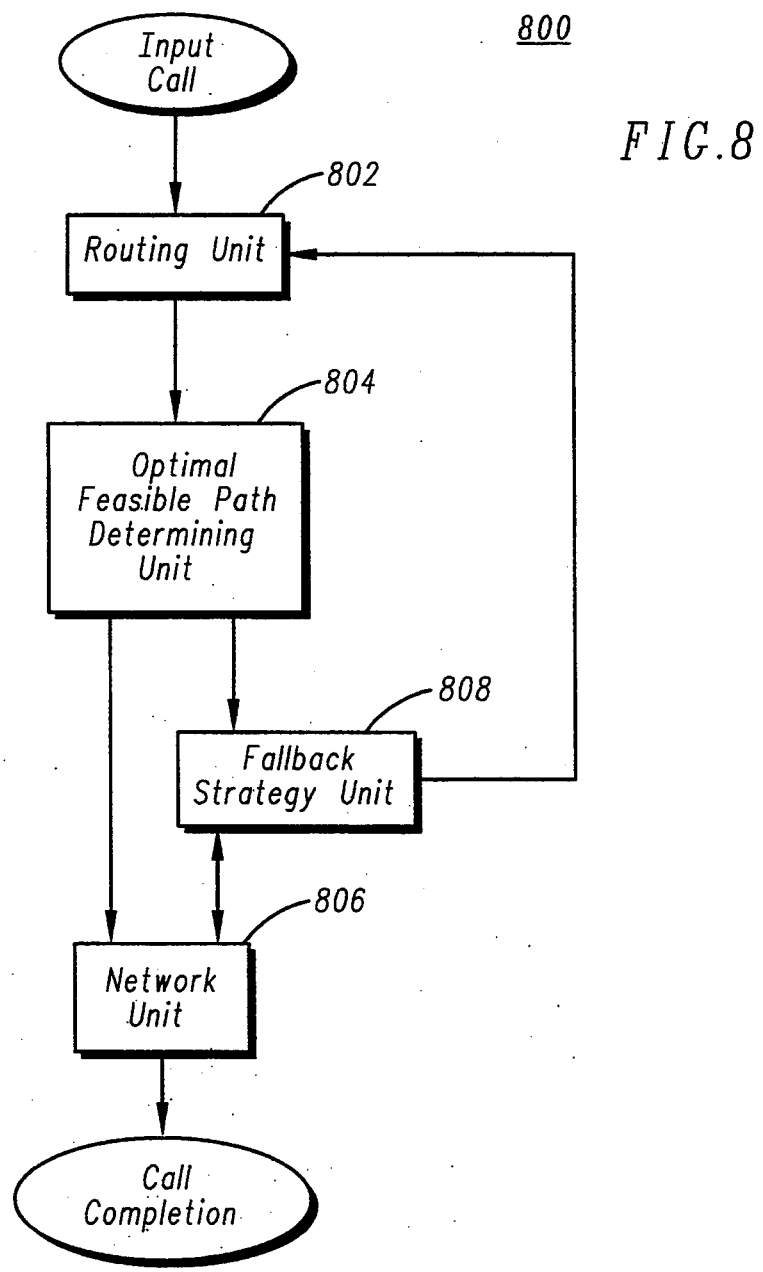
FIG. 8 illustrates another embodiment of the system for routing a call in an integrated traffic-type communication network in accordance with the present invention.
FIG. 9 is a diagram of a table setting forth some examples of typical performance constraints.

A performance constraint is a constraint on a directly perceivable measure of a quality of information transfer over a connection. Performance constraints may be negotiable or non-negotiable among the network and the end-users. A negotiable performance constraint is specified in terms of a range of values bounded by a requested value and an acceptable value. A requested value for a performance constraint is the most desirable performance level the user would like to have if resources are readily available. An acceptable value for a performance constraint is the least desirable performance level the user would tolerate. A non-negotiable performance constraint is specified in terms of only an acceptable value. Although each performance constraint is basically a path-dependent quality-of-service constraint, it can be implemented either as a path constraint or a link constraint. Some examples of typical performance constraints are shown in the table of FIG. 9, numeral 900.

For each negotiable performance constraint, an agreed value is determined by means of a three-party negotiation between the network and the end users. This agreed value must fall within a range bounded by the acceptable value and the requested value, inclusive. During a negotiation, if it is determined that a path is available such that the network is able to provide a performance value that is better than the requested value, the path is accepted, but only the requested value would be guaranteed. If the network cannot provide a performance value that is no worse than the acceptable value, the call would be blocked, or it may have to preempt other calls.

Due to path constraints such as delay, a routing problem is often formulated as a shortest-path problem where the length of the path is to be minimized. The value of each constrained path attribute may itself be a criterion for minimization. There are two issues here. One issue is that a multicriteria shortest-path problem is not a well-defined optimization problem unless all the criteria are embedded in one utility function which is used as the objective function for the shortest-path problem. The second issue is that a shortest-path problem with even one path constraint is known to be computationally intractable.

A resource constraint is a restriction on the use of a given type of network resource with a particular set of characteristics. Resource constraints, which are subject to user selection, may be directly related to quality-of-service (e.g., security), or indirectly related to quality-of-service (e.g., carrier selection). In conventional routing, resource constraints determine whether a given resource is acceptable or not for routing a call. The resource constraints are predetermined and do not depend upon the status of the network. Resources may refer to basic elements of a network (e.g., links), or aggregations of network elements (administrative domains). Each resource attribute (e.g., transmission medium) is associated with a set of possible attribute values (e.g., satellite, microwave, etc.).

Resource attributes may be specified with user preferences. For example, each attribute value may be specified by the user as one of the following resource preferences:

required At most one attribute value from a given attribute set may be configured "required." When an attribute value is configured "required," only resources characterized by this attribute value may be used.

preferred Resources characterized by attribute values configured "preferred" must be considered with priority over those characterized by attribute values configured otherwise, except for "required."

don't_care Resources characterized by attribute values configured "don't_care" may be considered only when no acceptable path can be found otherwise.

don't_use Resources characterized by attribute values configured "don't_use" must be avoided. At least one attribute value from a given attribute value set should be configured differently from "don't_use." A priority constraint is a condition imposed on the allocation of network resources to facilitate call preemption, the retrieval of network resources which have already been allocated to existing calls in order to accommodate new calls of greater importance. In the process, the existing calls may be terminated prematurely. Priority constraints are specified with respect to connection states. Since preemption is inherently disruptive, modern preemption algorithms are seldom completely ruthless in implementing preemption. Thus, routing without preemption is often attempted before preemption is considered (look-around-first preemption).

Figure 1:
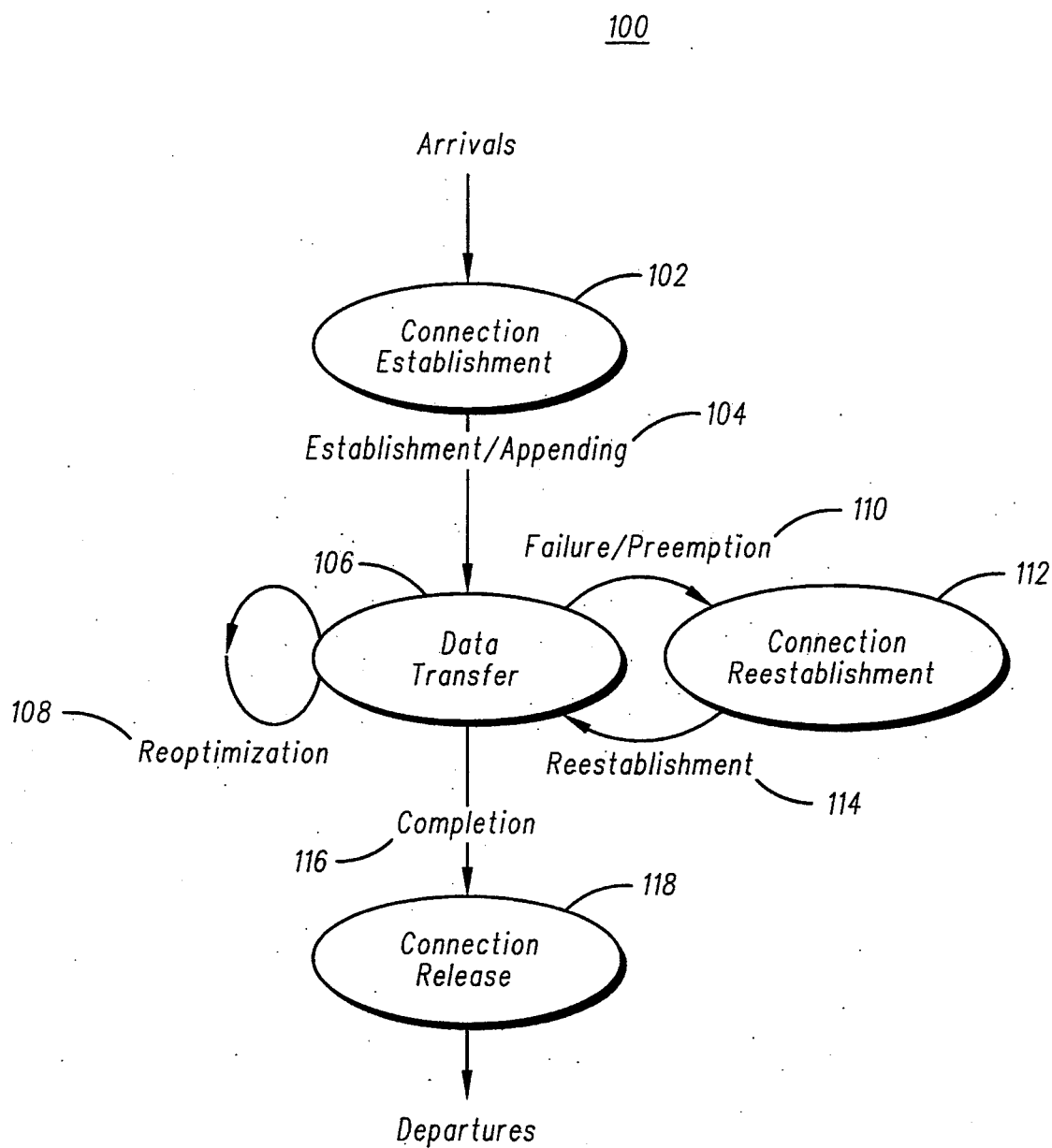
FIG. 1 is a flow chart setting forth a state diagram showing transitions among connection states in accordance with the present invention.

FIG. 1, numeral 100, is a flow chart setting forth a state diagram showing transitions among four different connection states in accordance with the present invention. Upon arrival of a call, a connection establishment state (102) is entered, i.e., the call is connected to the network system. Through Establishment/Appending (104), connection is accomplished for data transfer, and a routing path, a series of network resources between the point of call arrival and the point of destination that are allocated for use for the call, is determined. That is, establishment is the setting up of a point-to-point or point-to-multipoint connection within the network, and appending is adding a new user to an existing point-to-multipoint connection within the network. In the data transfer state (106), reoptimization (108), a predetermined system for conservation of network resources that are utilized by established connections, provides for maximizing use of network resources according to a predetermined strategy. Numerous reoptimization systems are known in the prior art. For example, as links of the network provide data transfer, the topology database of the network system is updated to inform routing units in the network of those links available for other data transfers. Thus, each call receives an optimized data transfer path in view of the available network resources at the time the routing is recomputed.

During the data transfer state (106), a network failure/preemption (110) may occur. That is, failure (110) of a network resource in the routing path of the call may disrupt data transfer, whereupon a connection reestablishment (in this case, a new routing) state (112) occurs and reestablishment (114) to the data transfer state (106) takes place. Also, a higher priority call may preempt (Preemption, 110) one or more of the network resources allocated to the present call, and a connection reestablishment state (112) is entered, providing for reestablishment (114) to the data transfer state (106). Reestablishment (114) in the case of preemption, for example, may also be achieved by new routing.

Upon completion (116) of the data transfer, i.e., leaving the data transfer state (106), the connection release state (118) is entered. Upon connection release, the call is completed.

In the priority mechanism of the present invention, each call is assigned a priority number for the connection establishment state (102) (establishment priority), the connection reestablishment state (112) (reestablishment priority), and the data transfer state (106) (retention priority). A preemption is permitted only when a priority of a preempting call is higher than a priority of a call to be preempted. The appropriate priority number used for comparison is the one that is associate with the connection state of the given call as shown above. The preempting call must be in either the connection establishment state (102) or the connection reestablishment state (112). For path determination, the preempted call may only be in the data transfer state (106). However, for preemption due to resource contention while resources are being allocated to a new connection, the preempted call may be in any connection state.

The fallback strategy of the method of the present invention avoids unnecessary preemption by permitting look-around-first preemption.

Figure 2:
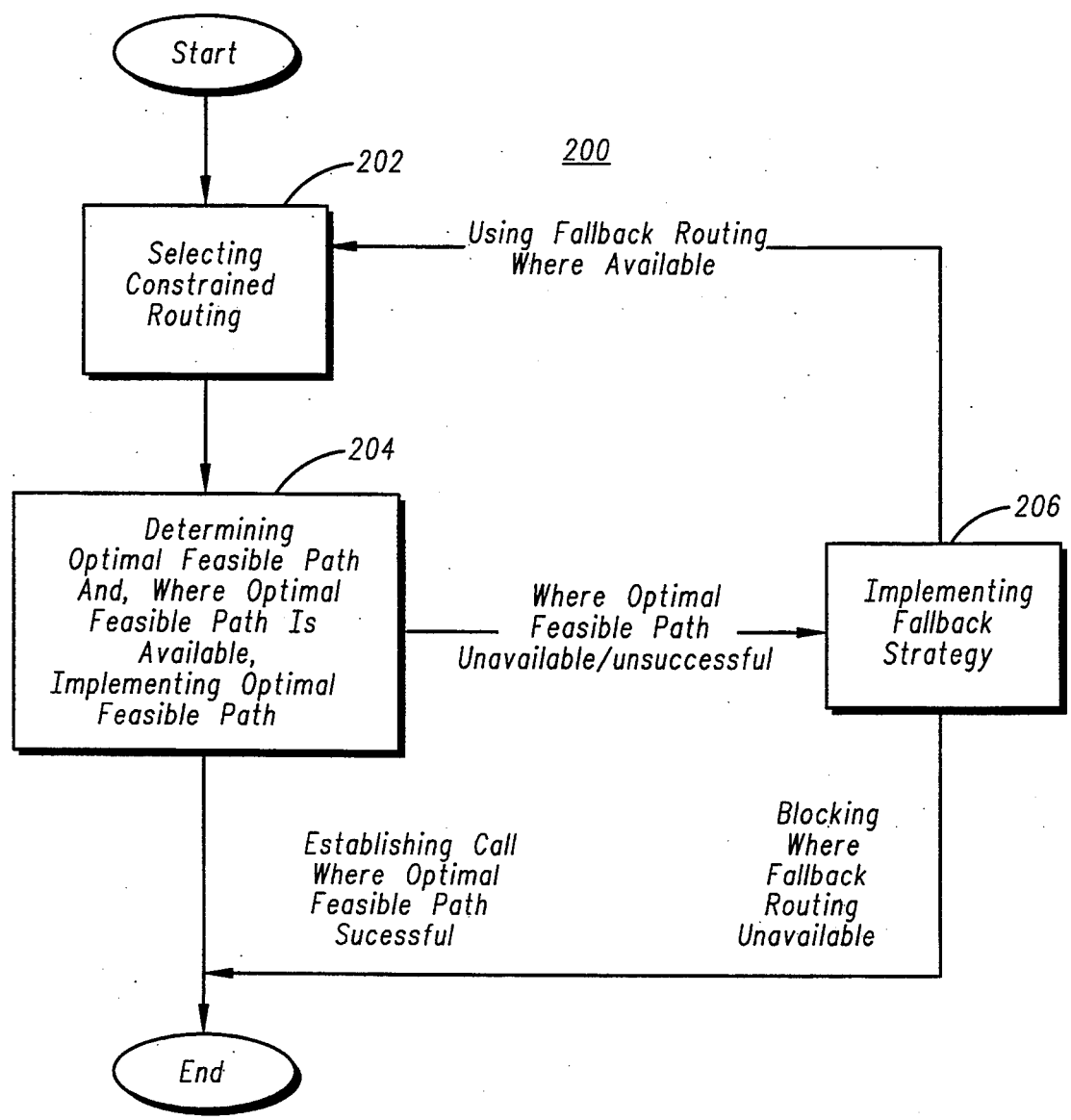
FIG. 2 is a flow chart illustrating steps for a first embodiment of the fallback strategy method of the present invention.

FIG. 2, numeral 200, is a flow chart illustrating steps for a first embodiment of the fallback strategy method of the present invention. The fallback strategy method is used for routing a call in an integrated traffic-type communication network, typically a network having diverse quality-of-service requirements. Integrated traffic-type communication networks are known in the art, and thus, are not further described herein. The fallback strategy method of the present invention utilizes the steps of (1) selecting a constrained routing for the call (202), (2) determining an optimal feasible path, and, where the optimal feasible path is available, the network's implementing the optimal feasible path (204), and (3) implementing a fallback strategy upon one of: determining that the optimal feasible path is unavailable under the selected constraints, and the network's being unsuccessful in implementing the optimal feasible path for routing the call (206).

Thus, whereas in alternate routing a sequence of predetermined paths is attempted, the fallback routing of the present invention utilizes alternate paths determined as needed based on a sequence for a constrained routing, where the constrained routing sequence may be predetermined, or alternatively, may be a real-time selection. The step of selecting a constrained routing (202) typically comprises determining a routing in accordance with a predetermined routing policy and a predetermined quality-of-service that generally includes link constraint(s), path constraint(s), and objective functions. Link constraints are typically based upon link availability, unallocated capacity for calls of various priority classes, link accuracy (e.g., bit error rate, frame loss rate), and link resource preferences. An objective function is a predetermined network- or user-selected performance goal. Path constraints and objective functions are typically based upon performance attributes such as cost and delay.

Where routing criteria based on multiple objective functions are utilized, the objective functions are ranked according to their predetermined levels of importance (for example, in accordance with a predetermined quality-of-service), and the ordered routing criteria are utilized for determining the constrained routing.

For example, a network communication system may include line signalling equipment located in exchanges, as is known in the art. For example, an "outgoing" exchange typically originates a call by turning off a forward signal tone, thereby effecting "seizure" of an available circuit to an "incoming" exchange and utilizes a signal to transmit the call. The "incoming" exchange utilizes control equipment to choose a constrained routing. The constrained routing may be determined by a connection state (e.g., call set-up, reroute, reoptimize) and at least a first quality-of-service requirement (e.g., highest priority, lowest cost) for the call. Constrained routing may include, for example, a predetermined delay that is acceptable to a user that has initiated the call in the communication system. Typically, the call includes information that allows the "incoming" exchange to determine an optimal feasible path that is available within the communication network for the transmission of the call to a destination indicated in the call information. Information for the optimal feasible path is then included in the signal for directing the call along the optimal feasible path in the communication network. Thus, if a further link is needed, the "incoming" link becomes an intermediate link that functions as an "outgoing" link for signalling purposes, i.e., for transmitting the call to a next link. This type of signalling is called link-by-link signalling. Clearly, hierarchical routing domains (e.g., administrative or geographic routing domains) may utilize the fallback routing method of the present invention wherein optimal feasible path determinations are made at more than one intermediate exchange. Where the "outgoing" exchange remains an "outgoing" exchange and signals transparently through at least a first intermediate exchange to achieve the optimal feasible path, the type of signalling is end-to-end signalling.

Determining an optimal feasible path and, where the optimal feasible path is available, the network's implementing the optimal feasible path (204) generally includes determining network resources (NR) required for the optimal path from a source to a destination for the call in the communication network, determining feasibility for allocating the NR, and allocating the NR for routing the call such that the call is established along the optimal feasible path. As described above, in one embodiment, network control processing of an intermediate exchange of the communication network determines the optimal path based on available network resources and determines the feasibility for implementing the optimal path. Where one of: the optimal feasible path is unavailable and implementing the optimal feasible path is unsuccessful, implementing a fallback strategy (206) provides for blocking the call when fallback routing is unavailable and for recycling to selecting constrained routing (202) when fallback routing is available.

A feasible path is a path that satisfies link constraints and path constraints, i.e., a workable constrained routing path, for a particular user call. Thus, if there exists at least one workable path subject to the constraints and along which there are sufficient resources available, such a path(s) is a feasible path. An optimal feasible path is a feasible path that minimizes a preselected routing objective function. Thus, a path is feasible where NR for a path of the call are indicated to be available and all path constraints are satisfied. Then, among all feasible paths, a feasible path that minimizes a selected objective function is the optimal feasible path. The path is infeasible where at least one network resource along a path for the call is indicated to be unavailable under the selected constraints or at least one path constraint is unmet. An optimal feasible path is unavailable where all paths for the call are infeasible or the path that minimizes the selected objective function has at least one unmet path constraint.

The method of the fallback routing strategy thus utilizes information derived from determining the optimal feasible path to determine fallback routing availability such that, where fallback routing is available, the network system recycles to selecting a constrained routing for the call, and where fallback routing is unavailable, the network system blocks the call. Clearly, only a finite number of routings for fallback routing exist for a call. The available fallback routings are typically ordered from highest to lowest choice according to predetermined fallback rules, and, upon recycling to selecting a constrained routing, a fallback routing having the highest choice of the available fallback routings is selected for each recycling instance until further fallback routing is unavailable. When further fallback routing is unavailable, the network system blocks the call.

Figure 3:
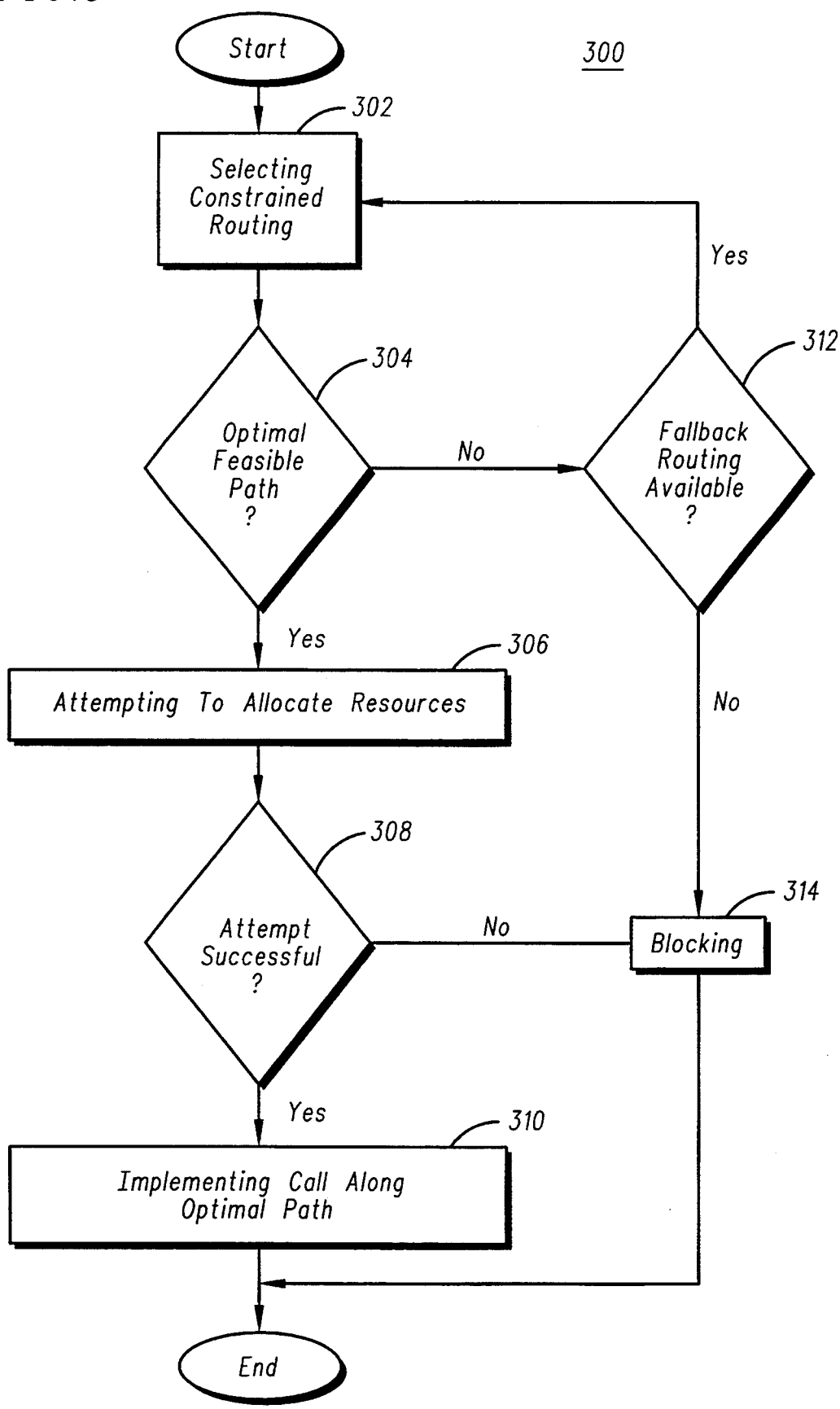
FIG. 3 is a flow chart illustrating steps for a second embodiment of the fallback strategy method of the present invention.

FIG. 3, numeral 300, is a flow chart illustrating steps for a second embodiment of the fallback strategy method of the present invention. The second embodiment of the method of the present invention for routing a call in an integrated traffic-type communication network, typically a network having diverse quality-of-service requirements, comprises the steps of: (1) selecting a constrained routing (302); (2) determining an optimal feasible path for sending the call through the communication network (304); (3) where the optimal feasible path is unavailable, determining whether fallback routing is available for the call (312); (4) where the optimal feasible path is available, the network system's attempting to allocate network resources along the optimal feasible path (306); determining if resource allocation attempt is successful and (5) where one of: the network resource allocation attempt is unsuccessful (308) and a fallback routing is unavailable, blocking transmission of the call (314); and (6) where the resource allocation attempt is successful (308), establishing the call along the optimal path with the allocated network resources (310).

Thus, the method of the present invention is initiated by selecting a constrained routing that is determined by a connection state (described above) and a call user's quality-of-service requirements. An optimal feasible path is determined, for example, by network control processing of an exchange. Feasibility is based, as described above, on link constraint(s) and path constraint(s). Where an optimal feasible path is unavailable, availability of fallback routing is determined. Typically, where more than one fallback routing is available, said fallback routings are ordered according to predetermined fallback rules. For example, fallback rules can depend on the connection state (see FIG. 7 description below). A highest order fallback routing is then selected as a next constrained routing, and the method proceeds as above. Where a fallback routing is determined, the network control processing system attempts to allocate network resources along a path for a constrained routing in accordance with the fallback routing. This attempt may fail. For example, where a network resource is in contention due to latency in topology updates, the resource will only be available to one call, leaving any other call without the availability of the resource at a particular time. Thus, fallback routing provides a means wherein a source (as, for example, a communication network exchange) selects a new constrained routing when a selected constrained routing is not available (i.e., where an attempt to route the call is unsuccessful). Where no fallback routing is available, establishment of the call is blocked (314).

Figure 4:
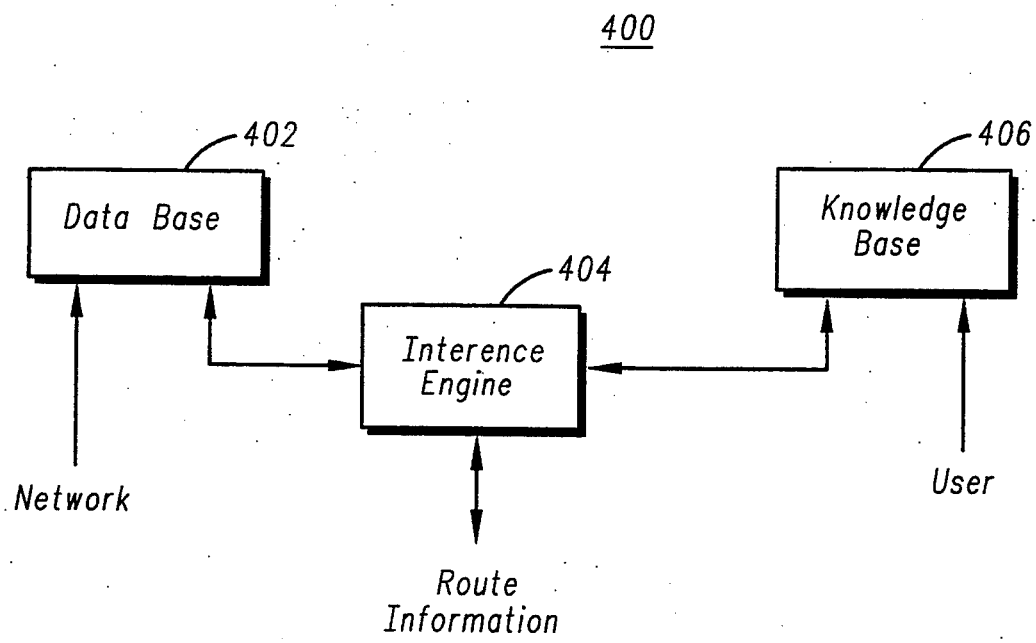
FIG. 4 is a flow chart showing a rule-based routing model that is utilized by the fallback routing strategy in an embodiment of the present invention.

FIG. 4, numeral 400, is a flow chart showing a rule-based routing model that is utilized by the fallback routing strategy by an embodiment of the present invention. This rule-based model is common in expert systems. The model comprises three modules: a data base (402) for storing topology information, an inference engine (404) for sequentially optimizing and implementing routing; and a knowledge base (406) for storing routing rules. Topology information typically includes, at a minimum, network link configuration and link availability information. A user inputs and, where selected, updates rules to the knowledge base (406). The network inputs data into the data base (402) as network resource configuration or uses change.

Figure 5:
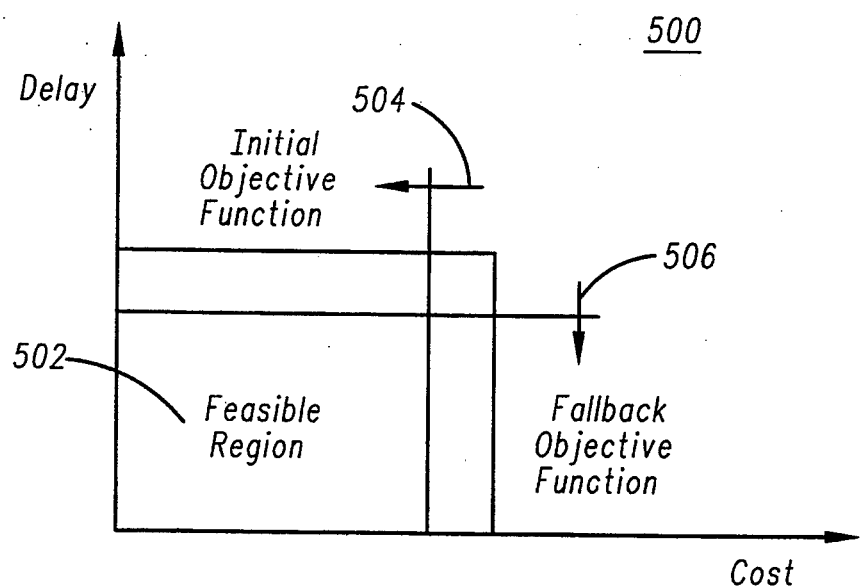
FIG. 5 is a diagram illustrating application of a heuristic algorithm for a constrained optimal path problem for cost and delay routing criteria in accordance with the present invention.

FIG. 5, numeral 500, is a diagram illustrating application of a heuristic algorithm for a multicriteria constrained shortest path problem with cost and delay as routing criteria in accordance with the present invention. Where multiple path constraints (for example, cost and delay) are utilized, a feasible region (502) may be established, but no single optimal feasible path may necessarily be said to be an only solution to satisfy the constrained routing criteria. Thus, the present invention provides for solving the original optimal-path problem without path constraints, and then provides for checking against path constraints to determine if the selected path is feasible. Incorporation of fallback routing allows each call to have more than one attempt to compare routing alternatives and establish a feasible path. Thus, FIG. 5 illustrates an exemplary embodiment of an implementation of a heuristic algorithm for the multi-criteria constrained shortest-path problem wherein two routing criteria, cost and delay, are ranked according to a predetermined degree of importance, and then are used to determine the optimal-path objective functions for initial (Initial Objective Function, 504) and fallback (Fallback Objective Function, 506) path determinations. It should be noted that, although it is desirable to favor paths with low cost and small delay, a typical user has a highest concern for meeting path constraints (i.e., completing a call).

Figure 6:
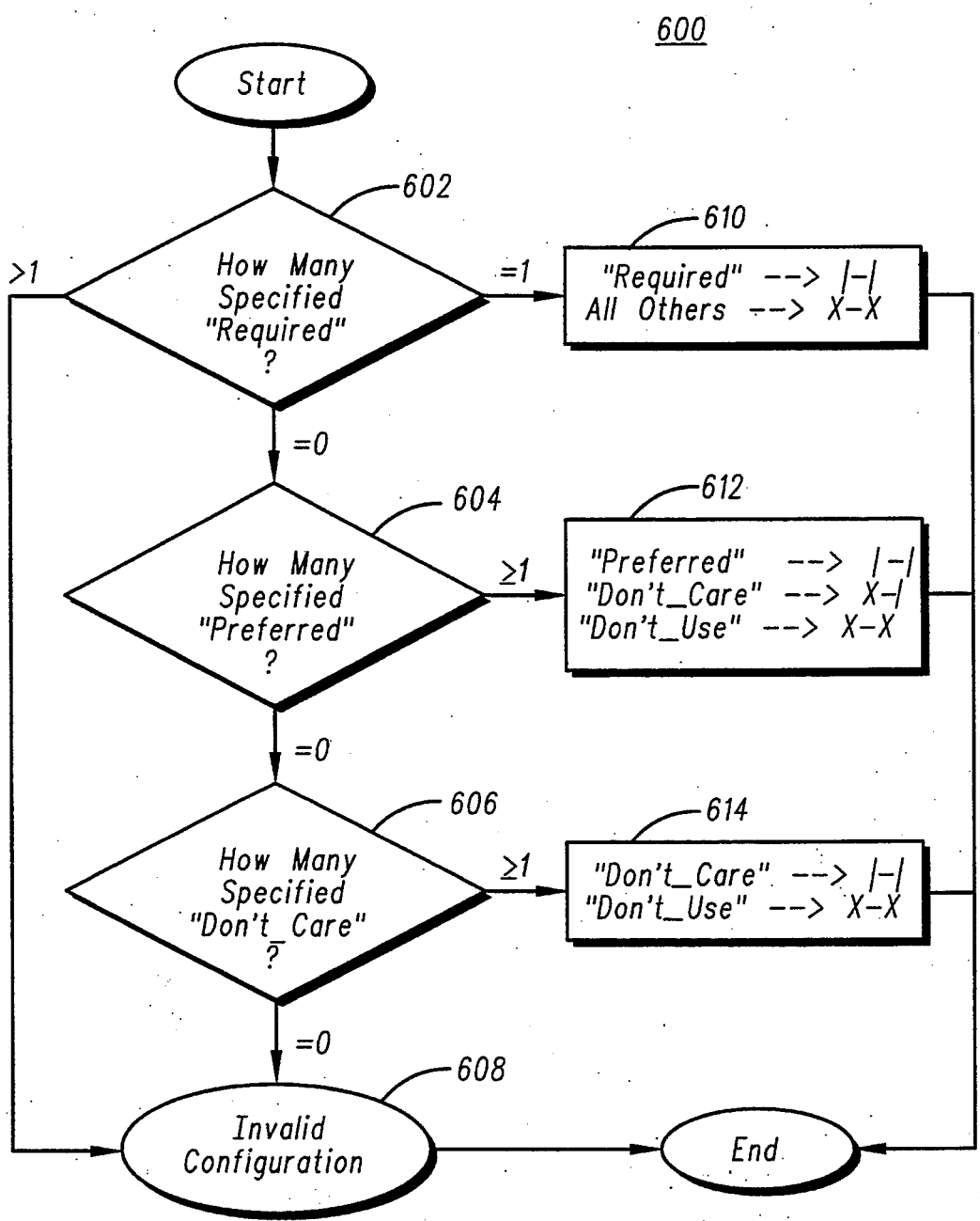
FIG. 6 is a flow chart illustrating steps for implementing preferential resource constraints in accordance with an embodiment of the present invention.

FIG. 6, numeral 600, is a flow chart illustrating steps for implementing preferential resource constraints in accordance with an embodiment of the present invention. Where the fallback routing method of the present invention accommodates preferential resource constraints, user preferences are translated into preferential sets of resource constraints. Each of the sets of resource constraints are then selected to define a constrained routing in accordance with predetermined rules. For the following description, "13-—" represents two letters separated by a dash, the letters being selected from X and I to represent exclusion (X) and inclusion (I) from/-with requested resource constraints (first letter) and acceptable resource constraints (second letter), respectively. Thus, "X—I" assigned to an attribute value means that the given attribute is excluded from a set of requested resource constraints, but is included in a set of acceptable resource constraints. I—I and X—X are similarly defined.

For example, as shown in FIG. 6, where resource preferences are translated into two sets of resource constraints, namely "requested resource constraints" and "acceptable resource constraints," one embodiment for selecting the preferential resource constraints for the fallback strategy of the method of the present invention includes, for each resource attribute: (1) the network system's determining how many resource attribute values are specified as required by the user (602); (2) where one required resource attribute value is specified by a user for a given resource attribute, the network system's assigning I—I to the required resource attribute value, and X—X to all other resource attribute values belonging to the same resource attribute (610); (3) where greater than one required resource attribute value is specified for a given resource attribute, the network system's classifying the selection as an invalid configuration (608); (4) where the number of required resource attribute values for a given resource attribute is zero, the network system's determining how many resource attribute values are preferred (604); (5) where one or more resource attribute values for a given resource attribute are preferred, the preferred resource attribute values being assigned I—I, any don't_care (see definition above) resource attribute values being assigned X—I, and any don't_use (see definition above) resource attribute values being assigned X—X (612); (6) where the number of required resource attribute values for a given resource attribute is zero and where the number of preferred resource attribute values for the same resource attribute is zero, the network system determines how many don't_care resource attribute values are specified (606); (7) where one or more resource attribute values for a given resource attribute are specified as don't_care, the don't_care resource attribute values being assigned I—I, and any don't_use resource attribute values being assigned X—X (614); and (8) where the number of required resource attribute values for a given resource attribute is zero, where the number of preferred resource attribute values for the same resource attribute is zero, and where the number of don't$_{13}$ care resource attribute values for the same resource attribute is zero, the network system's classifying the selection as an invalid configuration (608).

Priority constraints are implemented as link constraints that are dependent on connection states (see FIG. 1 description). For path determination, priority constraints modify an effective routing topology on a call-by-call basis. For call processing, the priority constraints are used to determine allocation of connection resources.

Figure 7:
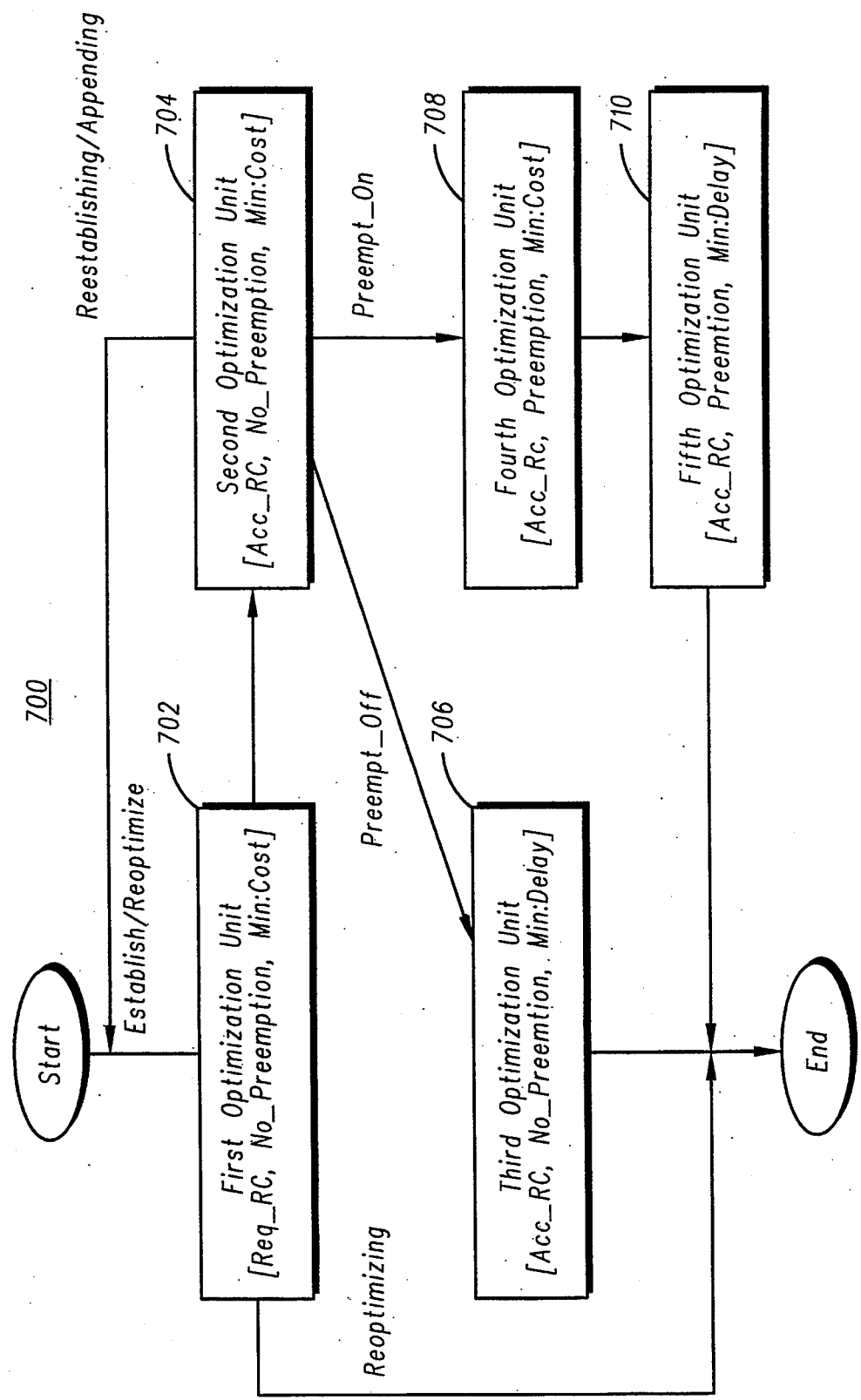
FIG. 7 is a block diagram of an exemplary embodiment of a communication network system that implements the method of the present invention.

FIG. 7, numeral 700, is a block diagram of an exemplary embodiment of a communication network system that implements the method of the present invention. The communication network system includes: (1) a first optimization unit (702), being a requested resource constraint (Req_RC) determiner operably coupled to receive a call, for providing at least one of: a first output and a second output, wherein the first output is a reoptimized call and the second output is an established call, for implementing requested resource constraints with non-preemptiveness (No_Preemption) and minimized cost (Min: Cost) for the call thus providing the established/reoptimized call; (2) a second optimization unit (704), being a first acceptable resource constraint (Acc_RC) determiner, operably coupled to receive the call, to receive the second output (established call) of the first optimization unit (702) (the Req_RC determiner), for implementing acceptable resource constraints (Acc_RC) with nonpreemptiveness (No_Preemption) and minimized cost (Min: Cost) to provide a non-preemptive output and a first preemptive output; (3) a third optimization unit (706), being a second acceptable resource constraint (Acc_RC) determiner, operably coupled to receive the first non-preemptive output, for implementing acceptable resource constraints (Acc_RC) with non-preemptiveness (No_Preemption) and minimized delay (Min: Delay) to provide a nonpreemtive delay-minimized output; (4) a fourth optimization unit (708), being a third acceptable resource constraint (Acc_RC) determiner, operably coupled to receive the first preemptive output, for implementing acceptable resource constraints (Acc_RC) with preemptiveness (Preemption) and minimized cost (Min: Cost) to provide a second preemptive cost-minimized output; and (5) a fifth optimization unit (710), being a fourth acceptable resource constraint (Acc_RC) determiner with preemptiveness, operably coupled to receive the second preemptive cost-minimized output, for implementing acceptable resource constraints (Acc_RC) with preemptiveness (Preemption) and for minimizing delay (Min: Delay) to provide a preemptive delay-minimized output.

Thus, in the exemplary embodiment, FIG. 7, resource constraints are specified with preferences and the translation scheme outline for FIG. 6 is utilized, providing fallback for a call in accordance with its connection state. In a connection state for connection without preemption, the initial constrained routing is defined by requested resource constraints, path constraints, and minimization of cost. Where an initial routing attempt is unsuccessful utilizing requested resource constraints, the communication network system provides a second attempt utilizing a fallback system having acceptable resource constraints. Where the second attempt is unsuccessful (e.g., the delay constraint is not satisfied), the communication network system provides a third attempt utilizing implementation of a delay-minimizing objective function, as opposed to a cost-minimizing function. Where the third attempt is unsuccessful, the system blocks the call. Where preemption is allowed (see constraints on preemption listed above), the communication network system provides an alternate fallback routing, providing preemptive implementation of acceptable resource constraints and minimizing cost, followed by preemptive implementation of acceptable resource constraints and minimizing delay.

FIG. 8, numeral 800, illustrates another embodiment of a system for routing a call in an integrated traffic-type communication network, typically a network having diverse quality-of-service requirements, in accordance with the present invention. The system includes: (1) a routing unit (802) for selecting a constrained routing for the call, (2) an optimal feasible path determining unit (804), operably coupled to the routing unit (802), for determining an optimal feasible path and, where the optimal feasible path is available, for sending a signal to a network unit (806), thereby causing the network unit (806) to implement the optimal feasible path, and (3) a fallback strategy unit (808), operably coupled to the optimal feasible path determining unit (804) and the network unit (806), for implementing a fallback strategy where one of: the optimal feasible path is unavailable, and the network is unsuccessful in implementing the optimal feasible path for routing the call. The system is understood to function similarly to the description set forth above.

In another embodiment the method for routing a call implementing a recursive fallback strategy may be implemented in a processor that generates the fallback strategy, for example, utilizing a neural network for generating logic to determine fallback routing, and implements the call-by-call routing strategy as described above.

Although an exemplary embodiment is described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for source based call-by-call routing of a call in a communication network, comprising the steps of:
   1A) selecting a constrained routing for the call;
   1B) determining an optimal feasible path, and, where the optimal feasible path is available, the network's implementing the optimal feasible path;
   1C) implementing a fallback strategy upon one of:
      1C1) determining that the optimal feasible path is unavailable under the selected constraints, or
      1C2) the network's being unsuccessful in implementing the optimal feasible path for routing the call
   where fallback routing allows accommodation of preferential resource constraints and look-around-first call preemption and where routing without preemption is attempted before preemption.

2. The method of claim 1 wherein the constrained routing comprises a routing in accordance with at least one of: path constraints and/or network constraints.

3. The method of claim 1 wherein the communication network is an integrated traffic-type communication network subject to diverse quality-of-service requirements.

4. The method of claim 3 wherein the quality-of-service requirements are ranked according to a predetermined level of importance of the path and/or network constraints.

5. The method of claim 1 wherein the constrained routing is determined in accordance with a predetermined routing policy and a predetermined quality-of-service.

6. The method of claim 5 wherein the predetermined routing policy and the predetermined quality-of-service include at least three elements: link constraint(s), path constraint(s), and objective function(s).

7. The method of claim 6 wherein the objective function is one of: delay or cost.

8. The method of claim 6 wherein, for determining an optimal feasible path,
   8A) where network resources, NR, for a path of the call are indicated to be available and all path constraints are satisfied, the path is feasible;
   8B) among all feasible paths, a feasible path that minimizes a selected objective function is the optimal feasible path.

9. The method of claim 6 wherein, for multiple objective functions, routing criteria are ranked according to a predetermined level of importance, and ordered routing criteria are utilized for determining the constrained routing.

10. The method of claim 1 wherein the constrained routing is determined by a connection state and at least a first quality-of-service requirement for the call.

11. The method of claim 10, further including that available connection states include: a connection establishment state operably coupled to a data transfer state, the data transfer state being operably coupled to a connection reestablishment state and to a connection release state, such that steps for permitting call preemption include:
   11A) assigning a priority number to each call in accordance with a connection state of the call; and
   11B) where the priority number of a preempting call is higher than a priority of a call to be preempted, allowing the preempting call to preempt the preempted call, wherein at least one of:
      11B1) for preemption to provide path determination, a preempted call is in the data transfer state and the preempting call is in one of: the connection establishment state and the connection reestablishment state, or
      11B2) for preemption due to resource contention while resources are being allocated to a new connection, the preempted call is in any one of the connection states.

12. The method of claim 1 wherein determining the optimal feasible path, and, where the optimal feasible path is available, the network's implementing the optimal feasible path, includes:
   12A) determining network resources (NR) required for the optimal feasible path from a source to a destination for the call in the communication network;
   12B) determining the availability for implementing the call using the NR; and
   12C) where available, allocating the NR for routing the call.

13. The method of claim 1 wherein the fallback routing strategy includes:
   utilizing information derived from determining the optimal feasible path to determine fallback routing availability such that,
      13A) where fallback routing is available, recycling to selecting a constrained routing for the call (step 1A); and
      13B) where fallback routing is unavailable, blocking the call.

14. A method for source based call-by-call routing of a call in a communication network, the method comprising the steps of:
   14A) selecting a constrained routing for the call;

14B) determining an optimal feasible path and, where available, implementing the optimal feasible path for the call;

14C) where the optimal feasible path is unavailable, determining whether fallback routing is available for the call 14C1) where fallback routing is available, selecting a fallback routing and recycling to the step of choosing a constrained routing for the call (step 14A);

14C2) where fallback routing is unavailable, blocking transmission of the call;

14D) where the optimal feasible path is available, the network's attempting to allocate network resources along the optimal feasible path;

14E) where the resource allocation attempt is unsuccessful, blocking transmission of the call;

14F) where the resource allocation attempt is successful, establishing the call where fallback routing allows accommodation of preferential resource constraints and look-around-first call preemption and where routing without preemption is attempted before preemption.

15. The method of claim 14 wherein the constrained routing comprises a routing in accordance with at least one of: path constraints and/or network constraints.

16. The method of claim 14 wherein the communication network is an integrated traffic-type communication network subject to diverse quality-of-service requirements.

17. The method of claim 16 wherein the quality-of-service requirements are ranked according to a predetermined level of importance of the oath and/or network constraints.

18. The method of claim 14 wherein the constrained routing is determined in accordance with a predetermined routing policy and a predetermined quality-of-service.

19. The method of claim 18 wherein the predetermined routing policy and the predetermined quality-of-service include at least three elements: link constraint(s), path constraint(s), and objective function(s).

20. The method of claim 19 wherein the objective function is one of: delay or cost.

21. The method of claim 19 wherein:
21A) where NR for a path of the call are indicated to be available and all path constraints are satisfied, the path is feasible;
21B) among all feasible paths, a feasible path that minimizes a selected objective function is the optimal feasible path.

22. The method of claim 19 wherein, for multiple objective functions, routing criteria are ranked according to a predetermined level of importance, and ordered routing criteria are utilized for determining the constrained routing.

23. The method of claim 14 wherein the constrained routing is determined by a connection state and at least a first quality-of-service requirement for the call.

24. The method of claim 23, further including that available connection states include: a connection establishment state operably coupled to a data transfer state, the data transfer state being operably coupled to a connection reestablishment state and to a connection release state, such that steps for permitting call preemption include:

24A) assigning a priority number to each call in accordance with a connection state of the call; and 24B) where the priority number of a preempting call is higher than a priority of a call to be preempted, allowing the preempting call to preempt the preempted call, wherein at least one of:

24B1) for preemption to provide path determination, a preempted call is in the data transfer state and the preempting call is in one of: the connection establishment state and the connection reestablishment state, and/or 24B2) for preemption due to resource contention while resources are being allocated to a new connection, the preempted call is in any one of the connection states.

25. The method of claim 14 wherein determining an optimal feasible path, and, where available, implementing the optimal feasible path for the call includes:

25A) determining an optimal feasible path from a source to a destination for the call in the communication network; and 25B) determining availability of network resources along the optimal feasible path.

26. The method of claim 14 wherein selecting a fallback routing includes utilizing information derived from determining the optimal feasible path to determine the fallback routing.

27. A system for source based call-by-call routing of a call in a communication network, comprising:

27A) routing means for selecting a constrained routing for the call;

27B) optimal feasible path determining means, operably coupled to the routing means, for determining an optimal feasible path, availability of implementing the optimal feasible path, and, where available, for sending a signal to a network means, thereby causing the network means to implement the optimal feasible path; and 27C) fallback strategy means, operably coupled to the optimal feasible path determining means and the network means, for implementing a fallback strategy where one of:

27C1) the optimal feasible path is unavailable, and/or

27C2) the network is unsuccessful in implementing the optimal feasible path for routing the call where fallback routing allows accommodation Of preferential resource constraints and look-around-first call preemption and where routing without preemption is attempted before preemption.

28. The system of claim 27 wherein the constrained routing comprises a routing in accordance with at least one of: path constraints and/Or network constraints.

29. The system of claim 27 wherein the communication network is an integrated traffic-type communication network subject to diverse quality-of-service requirements.

30. The system of claim 29 wherein the quality-of-service requirements are ranked according to a predetermined level of importance of the path and/or network constraints.

31. The system of claim 27 wherein the constrained routing is in accordance with a predetermined routing policy and a predetermined quality-of-service.

32. The system of claim 31 wherein the predetermined routing policy and the predetermined quality-of-service include at least three elements: link constraint(s), path constraint(s), and objective function(s).

33. The system of claim 32 wherein the objective function is one of: delay and cost.

34. The system of claim 32 wherein the optimal feasible path determining means provides:
   34A) where NR for a path of the call are indicated to be available and all path constraints are satisfied, the path is feasible;
   34B) among all feasible paths, a feasible path that minimizes a selected objective function is the optimal feasible path.

35. The system of claim 32 wherein, for multiple objective functions, the routing criteria are ranked according to a predetermined level of importance, and the ordered routing criteria are utilized for determining the constrained routing.

36. The system of claim 27 wherein the constrained routing is determined by a connection state and at least a first quality-of-service requirement for the call.

37. The system of claim 36, wherein the fallback strategy means further selects between available connection states that include: a connection establishment state operably coupled to a data transfer state, the data transfer state being operably coupled to a connection reestablishment state and to a connection release state, and further permits:
   37A) assigning a priority number to each call in accordance with a connection state of the call; and
   37B) where the priority number of a preempting call is higher than a priority of a call to be preempted, allowing the preempting call to preempt the preempted call, including at least one of:
      37B1) preempting to provide path determination where a preempted call is in the data transfer state and the preempting call is in one of: the connection establishment state and the connection reestablishment state, and
      37B2) preempting due to resource contention while resources are being allocated to a new connection where the preempted call is in any one of the connection states.

38. The system of claim 27 wherein the fallback strategy means further provides for determining an optimal feasible path, availability of implementing the optimal feasible path, and, where available, provides for implementing the optimal feasible path including:
   38A) determining network resources (NR) required for the optimal feasible path from the source to the destination for the call in the communication network;
   38B) determining availability for implementing the optimal feasible path; and
   38C) routing the call using the NR.

39. The system of claim 27 wherein the means for implementing the fallback routing strategy includes:
   means for utilizing information derived from determining the optimal feasible path to determine fallback routing availability and,
   39A) where fallback routing is available, means for recycling to means for selecting a constrained routing for the call (27A); and
   39B) where fallback routing is unavailable, blocking means for blocking the call.

40. The system of claim 27 wherein, where the network means is unsuccessful in utilizing the optimal feasible path for routing the call, the network means sends a signal to the fallback strategy means to cause the fallback strategy means to implement a fallback strategy.

41. A communication network system for routing an integrated traffic-type call in a communication network, comprising:
   41A) a requested resource constraint determiner, operably coupled to receive a call, for providing at least one of: a first output and a second output, wherein the first output is a reoptimized call and the second output is an established call, for implementing requested resource constraints with non-preemptiveness and minimized cost for the call to provide the established/reoptimized call,
   41B) a first acceptable resource constraint determiner, operably coupled to receive the call, to receive the second output (established call) of the requested resource constraint determiner, for, where one of: establishing the call is unsuccessful or reestablishing/appending the call is required, implementing acceptable resource constraints with non-preemptiveness and minimized cost to provide a non-preemptive output and a first preemptive output,
   41C) a second acceptable resource constraint determiner, operably coupled to receive the first non-preemptive output, for implementing acceptable resource constraints with non-preemptiveness and minimized delay to provide a non-preemptive delay-minimized output,
   41D) a third acceptable resource constraint determiner, operably coupled to receive the first preemptive output, for, where step 41(B) is unsuccessful, implementing acceptable resource constraints with preemptiveness and minimized cost to provide a second preemptive cost-minimized output, and
   41E) a fourth acceptable resource constraint determiner with preemptiveness, operably coupled to receive the second preemptive cost-minimized output, for implementing acceptable resource constraints with preemptiveness and minimizing delay to provide a preemptive delay-minimized output.

42. A method for routing a call in a communication network system, wherein "_-_" represents two letters separated by a dash, the letters being selected from X and I to represent exclusion (X) and inclusion (I) from/-with requested resource constraints (first letter) and acceptable resource constraints (second letter), respectively, the method comprising the steps of:
   42A) the network system's determining how many resource attribute values are specified as required by the user;
   42B) where one required resource attribute value is specified by a user for a given resource attribute, the network system's assigning I—I to the required resource attribute value, and X—X to all other resource attribute values belonging to the same resource attribute;
   42C) where greater than one required resource attribute value is specified for a given resource attribute, the network system's classifying the selection as an invalid configuration;
   42D) where the number of required resource attribute values for a given resource attribute is zero, the network system's determining how many resource attribute values are preferred;
   42E) where one or more resource attribute values for a given resource attribute are preferred, the preferred resource attribute values being assigned I—I, any don't_care resource attribute values (X—I) being assigned X—I, and any don't_use resource attribute values being assigned X—X;

42F) where the number of required resource attribute values for a given resource attribute is zero and where the number of preferred resource attribute values for the same resource attribute is zero, the network system's determining how many don't_care resource attribute values are specified;

42G) where one or more resource attribute values are specified as don't_care, the don't___care resource attribute values being assigned I—I, and any don't_use resource attribute values being assigned X—X; and

42H) where the number of required resource attribute values for a given resource attribute is zero, where the number of preferred resource attribute values for the same resource attribute is zero, and where the number of don't_care resource attribute values for the same resource attribute is zero, the network system's classifying the selection as an invalid configuration.

* * * * *